United States Patent [19]

Nakamura et al.

[11] Patent Number: 5,422,524
[45] Date of Patent: Jun. 6, 1995

[54] ANTIFRICTION BEARING AND ALTERNATOR INCORPORATING SAME FOR USE IN VEHICLES

[75] Inventors: Sigenobu Nakamura, Chiryu; Tutomu Siga, Aichi; Kenzo Mitani, Obu; Yoshiki Fujita, Osaka; Masayuki Kitamura, Osaka; Hiroyuki Miyazaki, Osaka; Teruo Hoshino, Osaka, all of Japan

[73] Assignees: Koyo Seiko Co., Ltd.; Nippondenso Co., Ltd., both of Osaka, Japan

[21] Appl. No.: 152,687

[22] Filed: Nov. 16, 1993

Related U.S. Application Data

[62] Division of Ser. No. 203,972, Jun. 8, 1988.

[30] Foreign Application Priority Data

Jun. 10, 1987 [JP] Japan ................. 62-145483
Jun. 10, 1987 [JP] Japan ................. 62-145484

[51] Int. Cl.[6] .................... F16C 35/00; H02K 5/16
[52] U.S. Cl. .................... 310/90; 310/42; 29/898.14
[58] Field of Search ................. 310/90, 263, 67 R, 42, 310/44, 45; 29/898, 898.14

[56] References Cited

U.S. PATENT DOCUMENTS

| | | | |
|---|---|---|---|
| 4,240,682 | 12/1980 | Benson | 384/625 |
| 4,323,401 | 4/1982 | Belke et al. | 384/625 |
| 4,429,924 | 2/1984 | Franz | 308/187 |
| 4,476,405 | 10/1984 | Komurasaki | 310/60 R |
| 4,546,280 | 10/1985 | Pflüger | 310/68 |
| 4,696,581 | 9/1987 | Tsushima et al. | 384/492 |
| 4,808,226 | 2/1989 | Adam | 75/246 |

Primary Examiner—Steven L. Stephan
Assistant Examiner—D. R. Haszko
Attorney, Agent, or Firm—Nikaido, Marmelstein Murray & Oram

[57] ABSTRACT

An antifriction bearing includes a fixed ring which comprises a steel containing up to about 10% of residual austenite. An alternator for vehicles includes a stator mounted on a frame, a rotor having its rotary shaft rotatably supported by a pair of bearings on the frame and a drive pulley mounted on one end of the shaft projecting outward from the frame. The outer ring of at least the bearing toward the pulley comprises a steel containing up to about 10% of residual austenite.

6 Claims, 4 Drawing Sheets

ANTIFRICTION BEARING AND ALTERNATOR INCORPORATING SAME FOR USE IN VEHICLES

This is a division of application Ser. No. 07/203,972 filed Jun. 8, 1988.

BACKGROUND OF THE INVENTION

The present invention relates to an antifriction bearing for use in an environment involving vibration or impact, and also to an alternator incorporating the bearing for use in vehicles.

The bearing rings and rolling members of the antifriction bearing (hereinafter referred to simply as the "bearing") are generally subjected to a cyclic high-shear stress due to a rolling motion, so that they are given high Rockwell hardness of HRC 58 to 64 by hardening and tempering so as to retain increased strength against rolling fatigue. It has been reported that there is the following relationship between the hardness and the rolling fatigue life. The life greatly shortens as the hardness decreases.

$$LH = fH^p \cdot L$$

wherein
LH: the life when the hardness varies
fH: the hardness factor
p: a constant (3 for ball bearings, or 10/3 for roller bearings)
L: the life of the standard bearing Further,
fH = $(HV/750)^2$
wherein HV is Vickers hardness Recently, however bearings are used for applications wherein the intended rolling fatigue life is not available merely by assuring the hardness.

With common bearings, the shearing stress due to the contact between the bearing rings and the rolling members develops a crack from an inclusion or the like, and the crack grows to cause flaking. In the case where the inner ring is rotated, such flaking occurs predominantly in the rotating ring, i.e., the inner ring. Conversely, in the case of bearings which are used in an environment involving vibration or impact, the vibration or impact causes many minute cracks or changes in the structure immediately under the raceway of the outer ring which is fixed, consequently giving rise to flaking within a very short period of time to render the bearing unserviceable.

This phenomenon appears attributable to the following reason. The vibration or impact deforms the raceway and becomes more pronounced, consequently causing greater microscropic strain in the ring under the raceway.

The rolling fatigue life can be lengthened most easily by increasing the size of the bearing to give an increased load capacity. This achieves an advantage since a reduced stress value will then result when the same load is applied. In actual use, however, the vibration or impact load readily varies with the structure around the bearing and mounting and operation conditions, and it is impossible to meet the requirement of decreasing the size and weight, so that the increase in the size of the bearing is not a satisfactory solution.

High-carbon chrominum steel (such as JIS SUJ2 or SAE 52100) as adjusted to -the hardness of HRC 58 to 64 by the usual hardening and tempering treatments as stated above is conventionally used for the inner and ouster rings of the bearings for alternators for vehicles.

In recent years, however, alternators are required to have a smaller size, reduced weight and higher output to meet the need to decrease the fuel cost of vehicles and increase various electrical loads thereof. To fulfill this requirement, it has become practice to use a greater pulley ratio and to rotate the alternator at a high speed. Accordingly, the maximum speed of rotation is in excess of 12000 r.p.m.

The problems involved in the high-speed rotation include the slippage of the belt in connection with the external arrangement of the alternator. This problem has been overcome by using a larger number of belts under increased tension. On the other hand, the problem associated with the internal arrangement of the alternator is the need to render the bearing resistant to the high-speed rotation and to the high tension involved. More specifically, because the heat of agitation due to the high-speed rotation and the increased frictional heat due to high tension shorten the life of the grease used, the bearing must be adapted to overcome this problem. Furthermore, the bearing must be rotatable at a high speed without marked vibration that would result from the deformation of the raceway due to high tension. Generally, the bearing is rotatable at a high speed satisfactorily when reduced in size, since the side reduction is effective for decreasing the amount of heat generation.

Nevertheless, in the case where the bearing is subjected to high tension as in the alternator, a reduced size leads to a decreased load capacity to entail a shortened fatigue life, so that the bearings in use are at least about 32 mm in outside diameter if smallest.

Briefly, in assuring high-speed rotation under increased tension as required for reducing the size and weight of the alternator and increasing the output thereof, it is necessary to solve the conflicting problems of inhibiting heat generation and taking a countermeasure against the increased load while diminishing the vibration, whereas difficulties are encountered with the convention alternator described in overcoming these problems.

SUMMARY OF THE INVENTION

An object of the present invention is to a bearing which is adapted to have a prolonged life in an environment of vibration or impact without increasing the size of the bearing.

Another object of the invention is to provide an alternator which is rotatable at an increased speed and is nevertheless operable under the resulting increased tension, as required for reducing the size and weight of the alternator and increasing the output thereof.

As already described, we have found that the early flaking of the outer ring of the bearing in use under vibration or impact is attributable to many cracks or changes in structure which occur immediately under the raceway under the dynamic action of excessive stress due to the severe load of the vibration or impact, and carried out repeated testing and research with attention directed to the heat treatment of the outer ring to give the ring resistance to cracks or changes in structure, whereby the present invention has been accomplished.

Stated more specifically, the present invention provides a bearing wherein the ring to be fixed comprises a steel up to about 10% in the amount of residual austenite.

The amount of residual austenite in the fixed ring should be up to about 10% for the following reason. The usual hardening-tempering treatment of steel permits about 11 to about 14% of austenite to remain on the average, and it is said that a somewhat higher content of residual austenite leads to an improved rolling fatigue life.

For example, C. Razim carburized steels such as 14NiCr14 (0.14% C, 0.46% Mn, 0.78% Cr and 3.67% Ni), 16MnCr5 and 20MoCr4 and tested the steels for fatigue by contact with a roller with the following conclusions (see C. Razim, Härterei Technische Mitteilungen, 22(1967), Heft 4, S. 32).

(1) The surface of the steel in contact with the roller underwent plastic deformation due to load stress. The width of contact therefore increased to result in a lower contact surface pressure consequently improving the pitting life.

(2) Rotation bending fatigue test revealed that the specimen containing 30 to 50% YR (residual austenite) was about 2 times the specimen of pure martensite in fatigue strength improvement.

(3) 14NiCr14 specimen with 50% YR was HV 550 in hardness. The testing changed the surface hardness to HV 950.

(4) It was not apparent whether the testing converted the YR to martensite. After the testing, a carbide was observed in the structure microscopically.

J.P. Sheahan et al. carburized SAE 8620 steel under varying conditions and subjected the steel to a pitting test with a roller to find that the specimens with a higher YR content were longer in pitting life than those with a lesser content. (see J. P. Sheahan and M. A. H. Howes, SAE 720268). A plastic flow and work hardening are suggested as the reason. O. W. Mcmullan shares the same concept as above, stating that the presence of YR is likely to mitigate the load stress.(see O. W. Mcmullan, Metal Progress (1962) April, p. 67).

According to R. A. Wilde, up to 10% of YR is not appropriate because of excessive hardness. He states that the presence of a proper amount of YR, which is optimally 10 to 25%, is useful for mitigating the load stress (see R. A. Wilde, Research Center Eaton and Towne Inc., (1967), Oct.).

Yajima et al., conducted a rolling fatigue test using bearing steel, with the result that the pitting life improved with increasing YR content (Yajima et al., The Japan Institute of Metals, Symposium, 1972)

Since a detailed examination of the portion immediately below the point of contact between the specimen and the steel ball indicated that the test increased the hardness from HV 750 to about HV 1000 and that the X-ray diffraction line due to austenite almost disappeared, they postulated that the result was due to the overall effect of ausforming and stained induced transformation. Like Yajima et al., Okamoto et al. carried out a rolling fatigue test using bearing steel to investigate the influence of YR on pitting life (see Okamoto et al., Seitetsu Kenkyu (Research on Iron Making), 1973, No. 277, p. 82). They directed attention to the fact that a specimen, containing YR, having a softer surface than the one almost free from YR, underwent plastic deformation at the surface to exhibit a reduction in the substantial surface pressure, when the specimens were subjected to the same load, and compared the tested specimens with the surface pressure corrected to find that the specimens having a higher YR content exhibited a longer pitting life than those with a lower YR content, as demonstrated by Yajima et al. The reasons given for the result achieved by the specimens with a higher YR are the function of a strain concentrator which repeatedly absorbs stress to prevent the occurrence and development of cracks, and hardening due to convertion to martensite due to work as shown in FIG. 1.

However, when a large amount of residual austenite is present, the structure of steel is unstable under vibration or impact, exhibits lower strength as shown in FIG. 4 and is susceptible to plastic deformation as already stated, with the result that the raceway deforms to permit further pronounced vibration or impact. The rolling frictional force also increases as shown in FIG. 5 to result in increased stress and to produce increased strain in the ring under the raceway. Alternatively, the structure is prone to a change due to strain induced transformation, and the resulting martensite structure, which is not tempered, is brittle.

Consequently, if the amount of residual austenite exceeds about 10%, the ring becomes susceptible to a local change in structure or to cracking due to vibration or impact. The amount of residual austenite is herein limited for the fixed ring based on the finding that the bearing life is substantially dependent on the damage to the fixed ring because the fixed ring, the loading region of which is more definite, is subject to the influence of vibration or impact more greatly. Preferably, the residual austenite content is up to 6%.

The residual austenite content can be reduced by conducting a sub-zero treatment between hardening and tempering. The sub-zero treatment converts austenite to martensite to decrease the residual austenite content.

The residual austenite content can be reduced also by adjusting at least one of the hardening heating temperature, hardening cooling rate and tempering temperature. For example, although tempering for usual bearings is conducted at 150° to 200° C. to obtain hardness of HRC 58 to 64, the tempering treatment, when carried out at a higher temperature of 250° to 380° C. reduces the residual austenite content, whereby the possible change in structure or cracking can be precluded.

The high-temperature tempering at 250° to 380° C. gives hardness of HRC 52 to 57 and is therefore likely to shorten the usual flaking life under the common operating conditions, whereas in the case where a vibration or impact load is involved, the structural change or cracking can then be prevented as stated above to result in a greatly lengthened service life.

The present treatment is conducted on the fixed ring, while the rotatable ring is treated in the same manner as usual bearings. By following this procedure, bearings are produced which, under the common operating conditions, show no problems.

Thus, the fixed ring of the bearing of the present invention is made of a steel having a residual austenite content of up to about 10%. Accordingly, even if subjected to vibration or impact, the ring is less prone to deformation at its raceway, remains stable in structure and is resistant to structural changes or cracking, with the result that the bearing is usable for a prolonged period of time in an environment involving vibration or impact without the necessity of being made larger in size.

The present invention further provides an alternator wherein the rotary shaft of a rotor is rotatably supported by a pair of bearings on a frame having a stator, and a drive pulley is mounted on one end of the rotary shaft projecting outward from the frame. The alternator is characterized in that the outer ring of at least the bearing toward the pulley comprises a steel up to about 10% in the amount of residual austenite, so as to preclude the marked vibration to be produced during high-speed rotation by the deformation of the raceway due to high tension.

With the alternator of the present invention, the bearing outer ring is reduced in residual austenite content as already described and is thereby prevented from plastic deformation at the raceway, whereby the raceway is prevented from caving in unevenly to assure diminished vibration, a reduced frictional force and inhibited heat evolution. This realizes a high-speed operation under increased tension, making it possible to reduce the size and weight of the alternator and increase the output thereof.

DESCRIPTION OF THE PREFERRED EMBODIMENTS

The foregoing effects were substantiated by the following examples of the invention wherein ball bearings were used.

The characteristics given below are required of bearing rings.

(1) High elastic limit since the ring is subjected locally to a high contact stress.
(2) Great rolling fatigue strength since a high contact load is repeatedly applied to the ring.
(3) High hardness.
(4) High abrasion resistance.
(5) Least susceptibility to secular changes.
(6) Amenability to heat treatment with high stability.

Accordingly, generally used are high-carbon chromium bearing steels such as JIS SUJ1, SUJ2 (equivalent to SAE52100), SUJ3, SUJ4 and SUJ5, and carburized bearing steels such as JIS SCr415, SCr420, SCM420, SNCM220, SNCM420 and SNCM815, SAE5120, SAE8620, SAE4320 and SAE9310, among which SUJ2 is most widely used.

Five kinds of specimens were prepared in Comparative Example 1 and Examples 1 to 4 as listed in Table 1 to substantiate the effects. The residual austenite content was determined by X-ray diffractiometry at a position 0.1 mm radially outward from the outer ring raceway.

TABLE 1

| Specimen | Material of outer ring | Heat treatment of outer ring | Residual austenite content of outer ring (%) |
| --- | --- | --- | --- |
| Comp. Ex. 1 | SUJ2 | Standard hardening Tempering | 11–14 |
| Example 1 | SUJ2 | Standard hardening Tempering at 350° C. | Up to 3 |
| Example 2 | SUJ2 | Standard hardening Sub-zero at −70° C. Tempering | 7.9 |
| Example 3 | SAE5120 | Carburization hardening Sub-zero at −196° C. Tempering | 5.7 |
| Example 4 | SAE5120 | Carburization hardening Sub-zero at −60° C. Tempering | 9.8 |

COMPARATIVE EXAMPLE 1

As a reference for comparing the effects, an existing bearing was used. The outer ring was made of SUJ2 and heated at a temperature of 845° C. for hardening. After hardening in oil, the ring was tempered at 180° C.

EXAMPLE 1

The outer ring was made of SUJ2 as in Comparative Example 1. The ring was heated at 845° C. for hardening, quenched in oil and tempered at 350° C.

EXAMPLE 2

The outer ring was prepared from SUJ2 as in Comparative Example 1. The ring was heated at 845° C. for hardening, quenched in oil, then subjected to a sub-zero treatment at −70° C. and thereafter tempered at 200° C.

EXAMPLE 3

The outer ring was prepared from SAE5120, subjected to carburization hardening, then immersed in liquid nitrogen (−196° C.) and thereafter tempered at 210° C.

EXAMPLE 4

The outer ring was prepared from SAE5120, subjected to carburization hardening and then to a subzero treatment at −60° C. and thereafter tempered at 200° C.

The sub-zero treatment affords higher hardness and lower toughness, so that the ring was subsequently tempered at a higher temperature than in the usual tempering process to give the ring the same hardness as when no sub-zero treatment was conducted.

Figure 1:
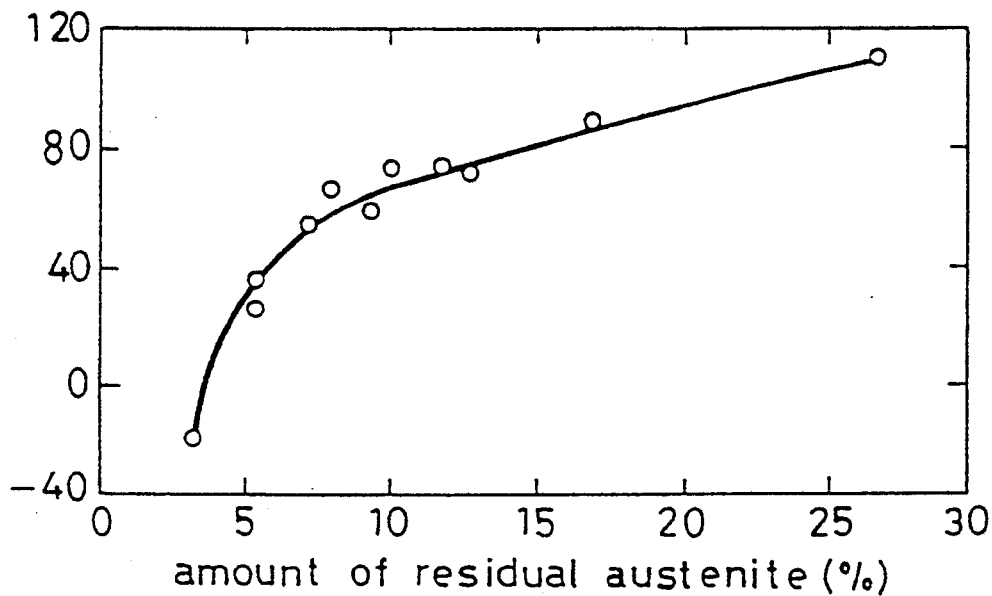
FIG. 1 is a graph showing the relationship between the amount of residual austenite and the increase in hardness.
Figure 2:
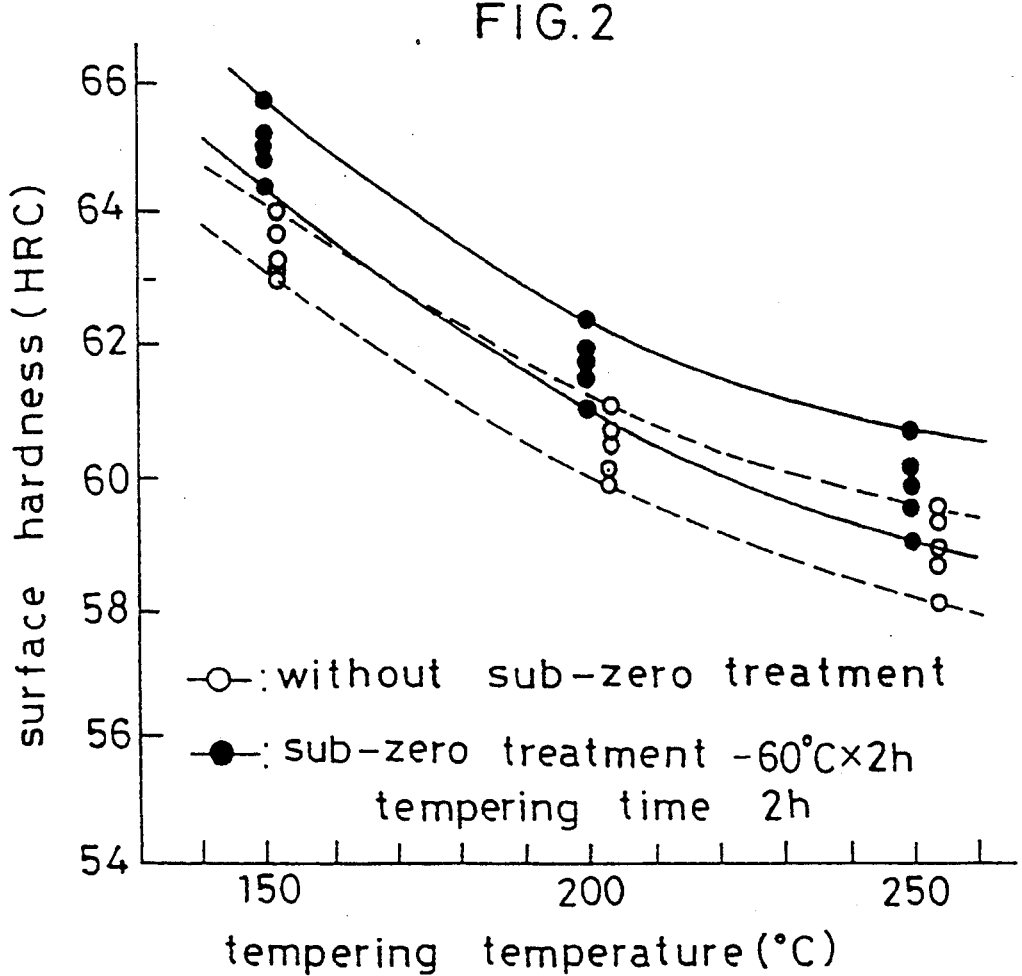
FIG. 2 is a graph showing the relationship between the tempering temperature and the surface hardness when a sub-zero treatment is conducted.

FIG. 2 shows the relationship between the tempering temperature of the sub-zero treated product and the surface hardness thereof.

A tester having the specimen installed therein was placed on a vibrating table, and the specimen was subjected to a vibration test by applying a load and vibration thereto at the same time with the inner ring held in rotation. The testing conditions were as follows.

Bearing load (static load)/load rating: 0.22
Speed of inner ring: 8000 r.p.m.
Calculated life (as above): 196 hours
Vibration acceleration: 10 G (on the vibrating table)
Testing time: 500 hours Each specimen was checked for the degree of fatigue in terms of the time taken for flaking.

Table 2 shows the result. Since the specimens exhibited no abnormalities except for the outer ring, the result is given only for the outer ring.

TABLE 2

| Specimen | Duration of rotation until flaking |
|---|---|
| Comp. Ex. 1 | 33 to 170 hours (n = 15) Flaking of outer ring |
| Example 1 | No flaking for 500 hours (n = 6) |
| Example 2 | No flaking for 500 hours (n = 6) |
| Example 3 | No flaking for 500 hours (n = 6) |
| Example 4 | No flaking for 500 hours (n = 6) |

In Comparative Example 1, many cracks and structural changes were observed immediately under the raceway of the outer ring after testing, whereas neither cracking nor structural change was found in Examples 1 and 3. Only a slight structural change was observed in Examples 2 and 4.

During the testing, the bearing before flaking was removed from the tester and was singly subjected to an axial load of 2.5 kgf with the inner ring rotated at 1800 r.p.m. to measure variations with time in the vibration acceleration of the outer side of the bearing. Table 3 shows the result.

TABLE 3

| | Variations in vibration acceleration with time (G) | | | | | |
|---|---|---|---|---|---|---|
| Specimen | Before test | After 10 hours | After 50 hours | After 100 hours | After 200 hours | After 500 hours |
| Comp. Ex. 1 | 0.07 | 0.28 | 0.40 | 0.51 | — | — |
| Ex. 1 | 0.05 | 0.06 | 0.09 | 0.12 | 0.14 | 0.16 |
| Ex. 2 | 0.06 | 0.07 | 0.09 | 0.13 | 0.13 | 0.17 |
| Ex. 3 | 0.06 | 0.08 | 0.10 | 0.13 | 0.14 | 0.16 |
| Ex. 4 | 0.07 | 0.09 | 0.11 | 0.14 | 0.15 | 0.18 |

The result reveals that the vibration increased markedly in Comparative Example 1 within a short period of time before flaking, indicating a marked deformation of the raceway. In Examples 1 to 4, unlike Comparative Example 1, there was little or no increase in vibration even after a prolonged period of rotation test, this indicating that the raceway remained unchanged despite the testing.

Tables 2 and 3 show that the bearings of Examples 1 to 4 of the invention are greatly improved in life over the existing bearing of Comparative Example 1.

Incidentally, the existing bearing of Comparative Example 1 was installed in the tester in the same manner as above and tested for rotation under a static load without giving any vibration using the same conditions as above in respect of the bearing load and the speed of inner ring. Even after rotation for 1500 hours, the bearing was free of flaking with no cracking or structural change observed immediately under the raceway. This indicates that the bearing is operable without any trouble under the usual conditions.

Figure 3:
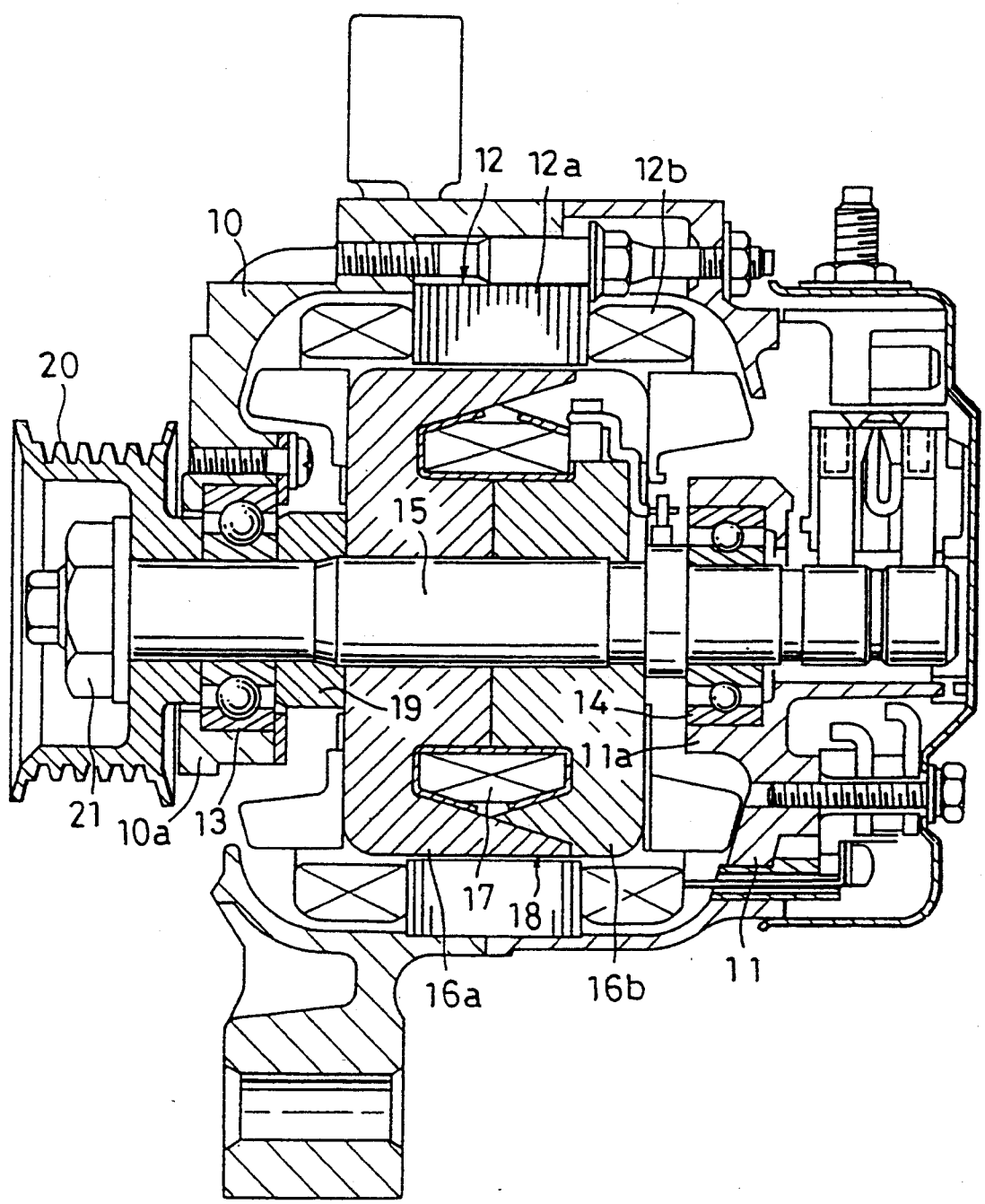
FIG. 3 is a view in vertical section showing an alternator embodying the invention.

Next, the result achieved by an alternator will be described to substantiate the effects of the invention. FIG. 3 shows the construction of the alternator.

A pair of frames 10 and 11 forming the shell of the alternator are each in the form of a bowl and are fastened to each other with bolts and nuts. A stator 12 is fixedly fitted to the inner peripheries of these frames 10 and 11 by a suitable method, as by a press fit. The stator 12 is a known one comprising a stator core 12a and a stator coil 12b wound around the core.

The frames 10, 11 are centrally formed with hollow cylindrical bearing boxes 10a, 11a, respectively, projecting inward. Radial ball bearings 13, 14 are mounted in the boxes 10a, 11a, respectively, and rotatably support a rotary shaft 15 thereon. A pair of pawl-shaped pole cores 16a, 16b are mechanically fixed to the shaft 15 so as to be positioned inside the stator 12. A rotor coil 17 is clamped between these cores. The shaft 15, pole cores 16a, 16b and rotor coil 17 provide a known rotor 18.

Between the first bearing 13 and the pole core 16a of the rotor 18, a collar 19 is fitted around the shaft 15. A pulley 20 positioned outside the frames 10, 11 is fastened with a nut 21 to the end of the shaft 15 projecting through the first bearing 13 out of the frame 10. The shaft 15 is rotatable by an engine (not shown) through the pulley 20.

Of the inner rings and the outer rings of the pair of bearings 13, 14, at least the outer ring of the bearing 13 adjacent to the pulley 20 is made of a steel which is up to 10% in the amount of residual austenite.

The residual austenite content is reduced to not higher than 10% by the method already stated.

Figure 4:
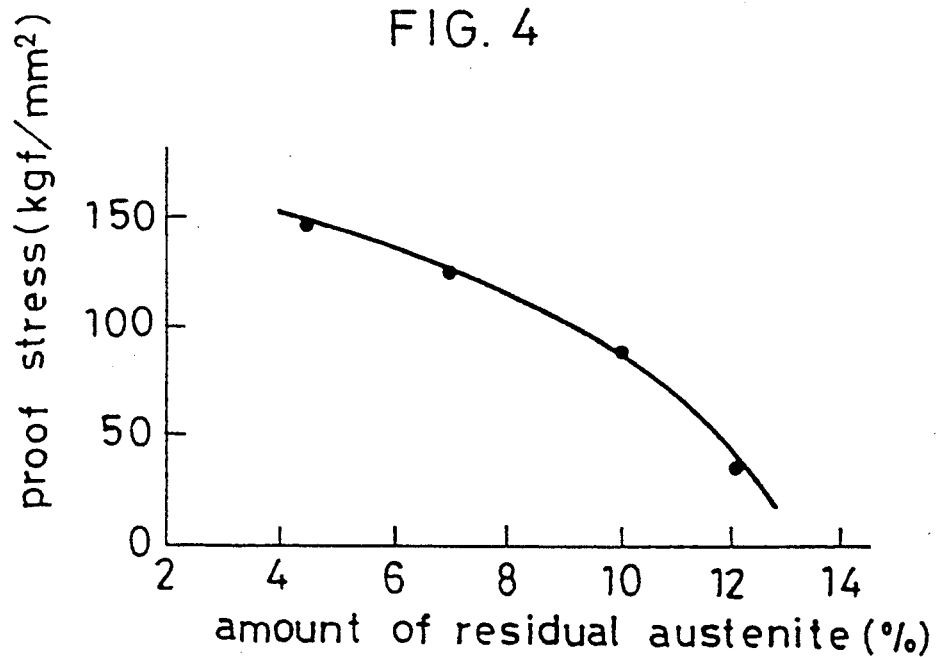
FIG. 4 is a graph showing the relationship between the amount of residual austenite and the proof stress.
Figure 5:
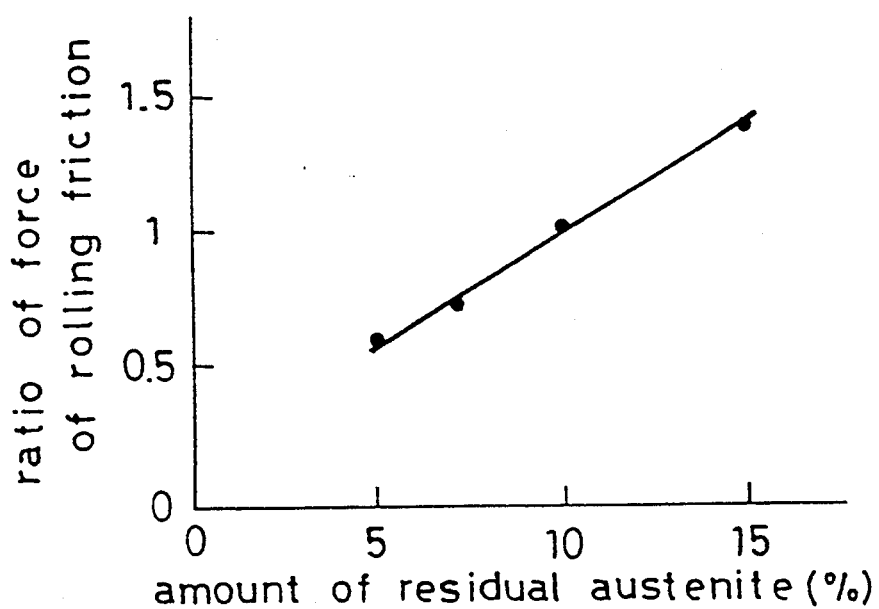
FIG. 5 is a graph showing the relationship between the amount of residual austenite and the force of rolling friction.

FIG. 5 shows the relationship between the amount of residual austenite and the force of rolling friction. The ratio of rolling frictional force plotted in FIG. 5 is 1 when the amount of residual austenite is 10% in the case where the contact surface pressure is 250 kgf/mm$^2$. FIG. 4 shows the relationship between the amount of residual austenite and the proof stress. The proof stress plotted in FIG. 4 is at the strain of $5 \times 10^{-6}$. Austenite is a structure of lower proof stress than martensite, so that the raceway subjected to a load when the balls roll along, if having a high austenite content, deforms to cause the balls to roll along a recess to produce an increased frictional force. Conversely, a reduction in the austenite content inhibits heat generation within the bearing due to the high-speed operation of the alterator under high tension, assuring improved endurance against seizure. Further in the presence of a large amount of residual austenite, an increased load due to high tension renders the raceway liable to plastic deformation, with the result that vibration occurs every time the balls roll along an unevenly recessed portion during rotation. When the alternator is driven at a high speed, the vibration becomes more pronounced, possibly causing the rotor to interfere with the stator to result in locking. It is effective to reduce the residual austenite content to preclude such plastic deformation.

To substantiate the above effect achieved by reducing the residual austenite content, examples are given below wherein radial ball bearings were used.

First, four kinds of specimens were prepared in Comparative Example 2 and Examples 5 to 7 as bearings toward the pulley of the alternator, using the material given in Table 4 for the inner and outer rings. Specimens were also prepared as the bearings on the other side (rear side) using the same material as in Comparative Example 2 for the inner and outer rings.

COMPARATIVE EXAMPLE 2

As a reference for the comparison of the effect, an existing bearing was used which was prepared from SUJ2 generally in use as a bearing material. The hardening heating temperature was 845° C. Oil hardening was followed by tempering at 180° C.

EXAMPLE 5

The material used was SUJ2 as in Comparative Example 2. Heating at 845° C. for hardening was followed by oil quenching and then by tempering at 350° C.

EXAMPLE 6

The material used was SUJ2 as in Comparative Example 2. Heating at 845° C. for hardening was followed by oil quenching, then by a sub-zero treatment at −60° C. and thereafter by tempering at 200° C.

EXAMPLE 7

The material used was SUJ2 as in Comparative Example 2. Heating at 845° C. for hardening was followed by oil quenching, then by a sub-zero treatment at −196° C. and thereafter by tempering at 200° C.

TABLE 4

| Specimen | Material | Heat treatment | Residual austenite content (%) |
|---|---|---|---|
| Comp. Ex. 2 | SUJ2 | Standard hardening Tempering | 11–14 |
| Ex. 5 | SUJ2 | Standard hardening Tempering at 350° C. | Up to 3 |
| Ex. 6 | SUJ2 | Standard hardening Sub-zero at −60° C. Tempering | 9.7 |
| Ex. 7 | SUJ2 | Standard hardening Sub-zero at −196° C. Tempering | 5.9 |

The residual austenite content was determined by X-ray diffractiometry over the depth of 0.2 mm from the bearing raceway radially outward thereof. The bearing on the pulley side was of the size being No. 6302 (42 mm in outside diameter), and the bearing on the rear side was of the size bearing No. 6002 (32 mm in outside diameter).

Each pair of specimens was incorporated into an alternator and subjected to a high-speed high-tension test under the following conditions.

TABLE 5

| Specimen | Duration of rotation until failure |
|---|---|
| Comp. Ex. 2 | 980 to 1260 horus, n = 10 |
| Example 5 | No failure for 2500 hours (thereafter discontinued) n = 5 |
| Example 6 | No failure for 2500 hours (thereafter discontinued) n = 5 |
| Example 7 | No failure for 2500 hours (thereafter discontinued) n = 5 |

A failure occurred only in Comparative Example 2. More specifically, the failure was seizure involving carbonization of the grease and marked discoloration of the inner and outer rings and the balls, and the retainer was broken to lock the rotatable ring. The bearing on the pulley side only failed because this bearing, which is close to the pulley, is subjected to a greater momental load and therefore heated to a higher temperature than the other bearing on the rear side.

Although no failure occurred in Examples 5 to 7, the grease was checked for oxidation deterioration by infrared spectroscopic analysis, which revealed almost no deterioration in Examples 5 and 7 but deterioration proceeding in Example 6 only.

In Comparative Example 2, the temperature of the inner and outer rings was measured under the testing conditions to find that the outer ring was 8 to 12° C. higher than the inner ring in temperature. This indicates the following. The inner ring is connected to the rotor, which is driven at a higher speed than conventionally and is therefore fully self-cooled by a fan effect to lower the temperature of the inner ring to a level lower than in the prior art, whereas the outer ring is mounted on the frames having attached thereto the stator which evolves a larger amount of heat due to a higher output, with the result that a larger amount of heat is transferred from the stator to the outer ring to result in a higher temperature than conventionally.

Figure 6:
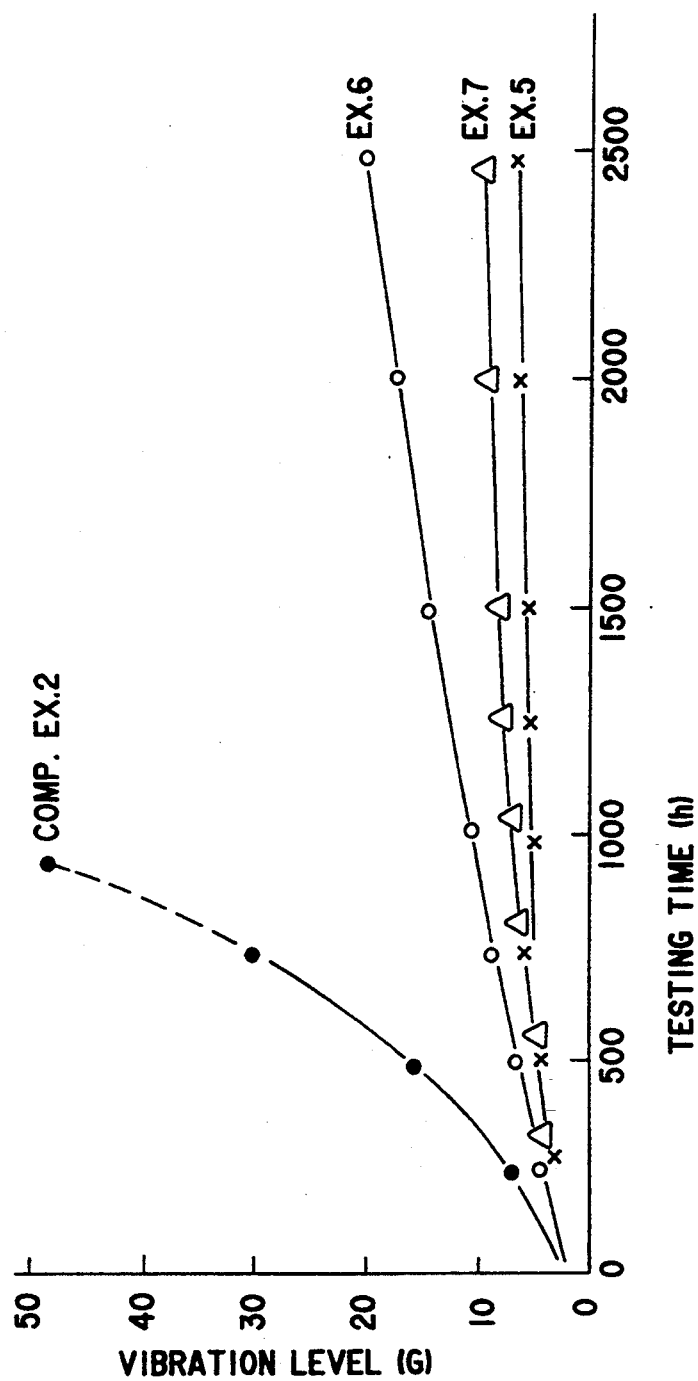
FIG. 6 is a graph showing variations in the vibration level with the lapse of testing time.

For illustrative purposes, FIG. 6 shows the result obtained by measuring variations in the vibration level with the lapse of testing time by a vibration acceleration sensor attached to the frame. Although the specimens tested were found free of the failure that the rotor interferes with the stator to lock the rotatable ring, Comparative Example 2 exhibited a higher vibration level. Presumably, this indicates that the higher residual austenite content leads to greater plastic deformation.

Thus, when incorporating the bearings of Examples 5 to 7 containing a reduced amount of residual austenite, the alternator can be adapted for a high-speed operation under increased tension.

Incidentally, the conventional bearings for use in precision machines or devices or the like include those subjected to the sub-zero treatment in order to inhibit the dimensional variations due to the decomposition of austenite. According to the present invention, on the other band, attention is directed not to such dimensional stability but to the characteristics of residual austenite per se to provide the combination of an alternator and a bearing which contains a reduced amount of residual austenite so as to exhibit outstanding performance in an environment involving vibration or impact. Consequently, the invention achieves the entirely novel effect of making the alternator smaller in size, lower in weight and higher in output.

Carburized materials such as SAE5120 are usable for the present bearing to conduct the sub-zero treatment after carburization hardening. In this case, unlike the use of SUJ2, additional compressive residual stress is available which is advantageous to fatigue life. Accordingly, such materials are useful for assuring higher tension for rotation at a further increased speed as will be apparent from the result of Examples 3 and 4 listed in Table 2 and achieved with the ball bearings.

What is claimed is:

1. An alternator for vehicles comprising a rotary shaft of a rotor which is rotably supported by a pair of bearings,..each comprising a fixed ring and a rotary ring, on a frame having a stator, and a drive pulley which is mounted on one end of the rotary shaft projecting outward from the frame, wherein the alternator comprises at least the bearing directed toward the pulley comprising a fixed ring comprising a steel containing up to about 10% of residual austenite.

2. An alternator as defined in claim 1 wherein said steel containing limited proportion of austenite has been made by subjecting steel having a higher austenite content to a sub-zero treatment.

3. An alternator as defined in claim 1 wherein said steel containing limited proportion of austenite has been made by subjecting steel having a higher austenite content to tempering at a temperature of 250° to 380° C.

4. An alternator as defined in claim 1 wherein said steel containing limited proportion of austenite has been made by subjecting steel having a higher austenite content to a sub-zero treatment and a subsequent tempering treatment at a temperature of 170° to 230° C.

5. An alternator as defined in claim 1 wherein said steel has been subjected to carburization hardening.

6. An alternator as defined in claim 1 wherein the amount of residual austenite is up to 6%.

* * * * *